ary Examiner—Donald R. Schran
United States Patent [19]
Pachmayr et al.

[11] 3,926,232
[45] Dec. 16, 1975

[54] APPARATUS FOR CUTTING PATTERN IN GUN STOCK OR OTHER WORK PIECE

[75] Inventors: Frank A. Pachmayr, Los Angeles; Edward B. Miller, Harbor City, both of Calif.

[73] Assignee: Pachmayr Gun Works, Inc., Los Angeles, Calif.

[22] Filed: Sept. 23, 1974

[21] Appl. No.: 508,329

Related U.S. Application Data
[62] Division of Ser. No. 156,655, June 25, 1971.

[52] U.S. Cl. ........ 144/136 J; 144/309 A; 83/647.5; 144/328; 101/3 R
[51] Int. Cl.² .......................................... B27M 3/22
[58] Field of Search ......... 144/136 J, 136 R, 309 A, 144/327, 328; 83/647.5; 101/3 R, 6, 5, 10, 11, 16, 20

[56] References Cited
UNITED STATES PATENTS
331,769  12/1885  Compton ............................ 101/23
3,229,401  1/1966  Sobran ............................ 144/328 X
3,231,455  1/1966  Campbell et al. .................... 144/327
3,416,398  12/1968  Bodine .............................. 83/647.5

*Primary Examiner*—Donald R. Schran
*Attorney, Agent, or Firm*—William P. Green

[57] ABSTRACT

A machine for cutting a 'checkering' pattern or other ornamental pattern in a gun stock or other structure by means of one or more cutter structures having cutting edges shaped in correspondence with the desired pattern, with the machine acting to produce relative vibratory movement of the cutter structure and work piece, and preferably also relative oscillatory movement in a second direction, and in a controlled manner very positively and effectively forming the pattern in the work piece.

21 Claims, 30 Drawing Figures

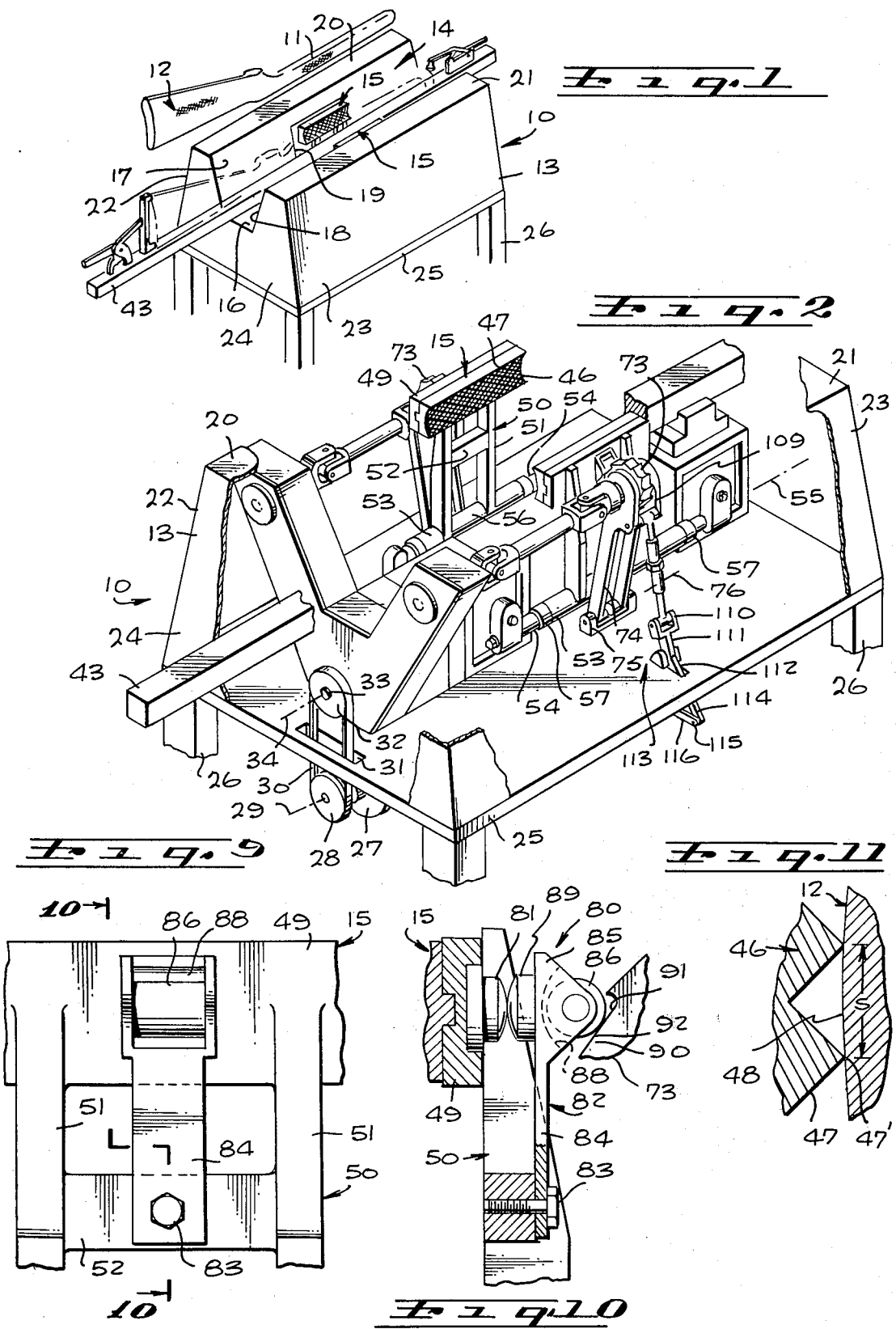

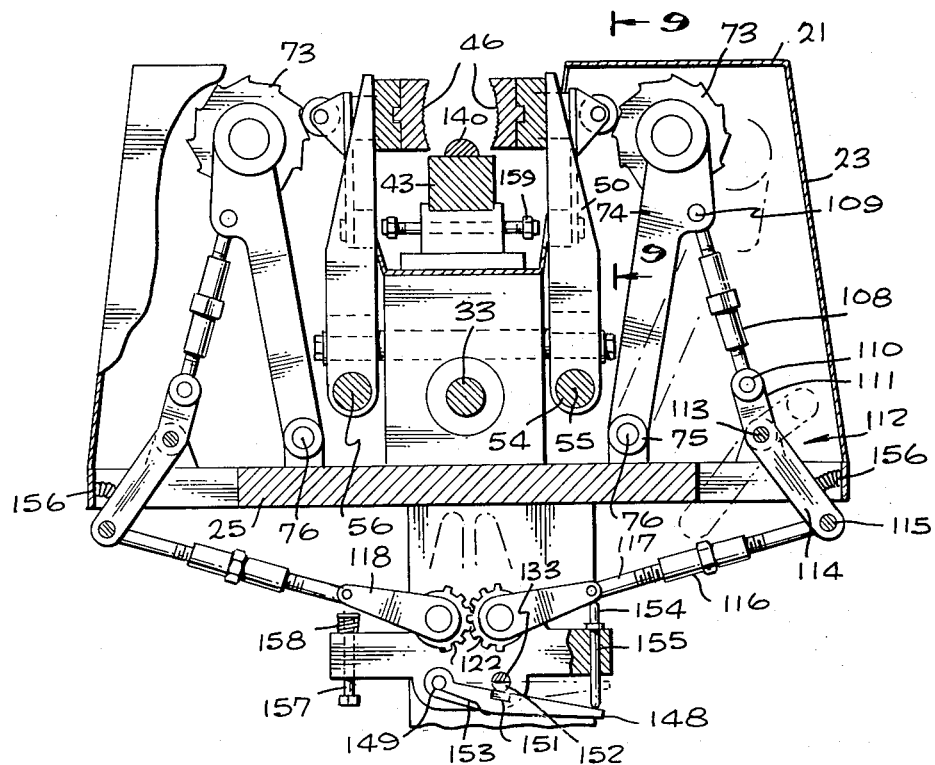
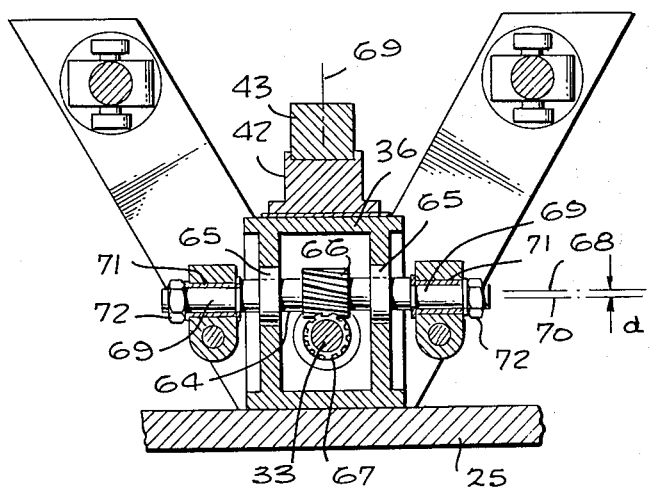

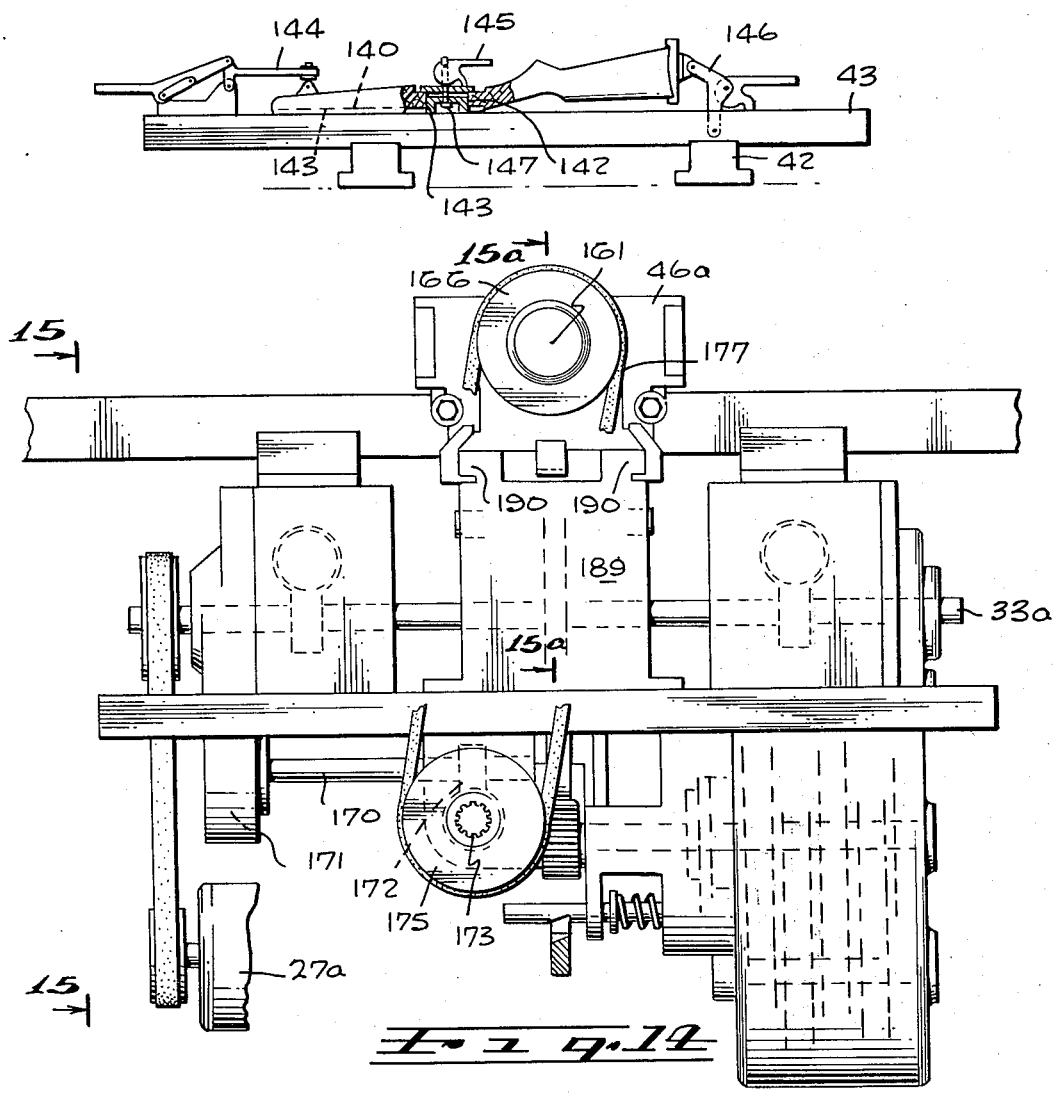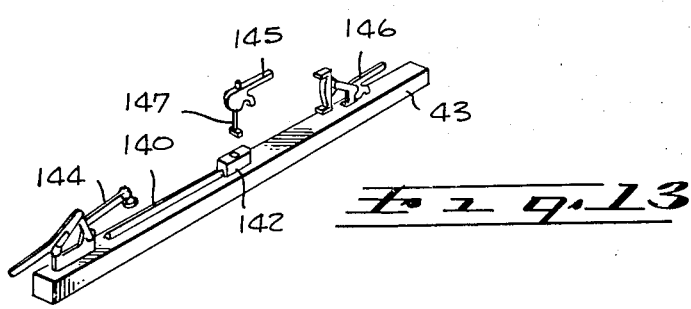

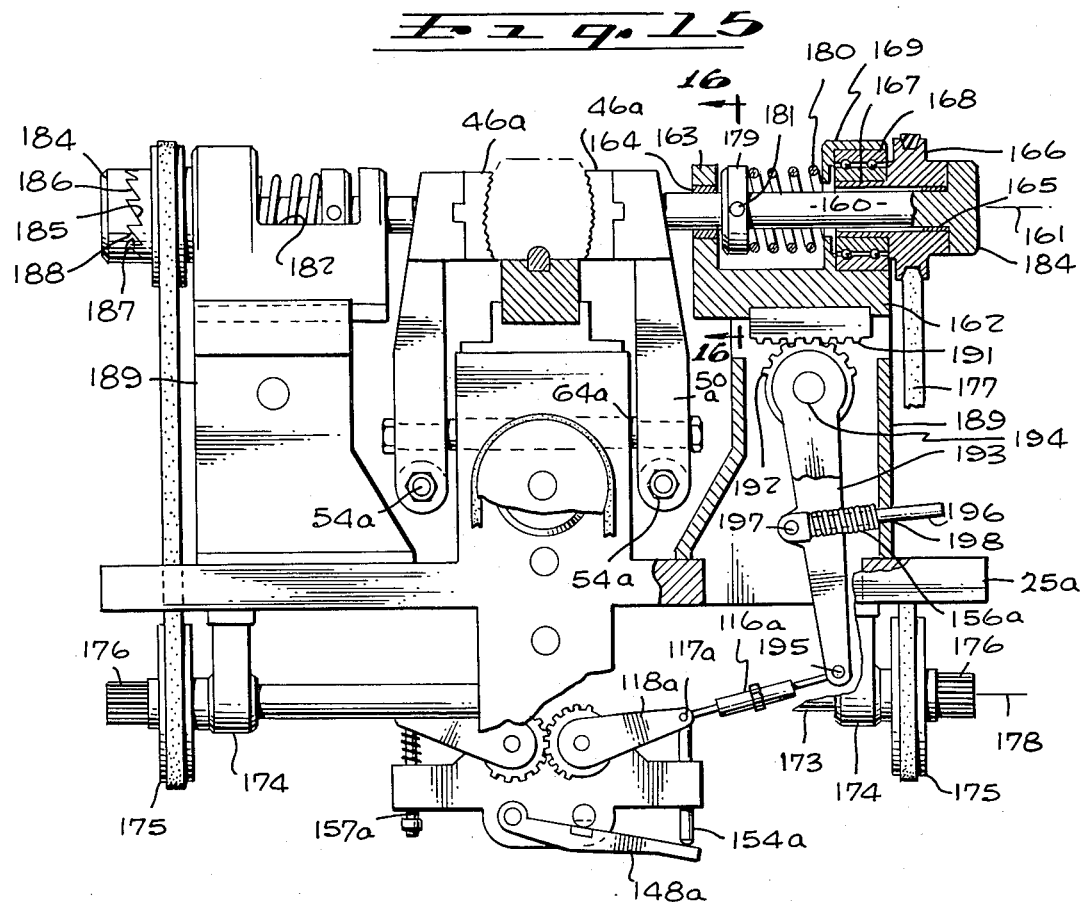
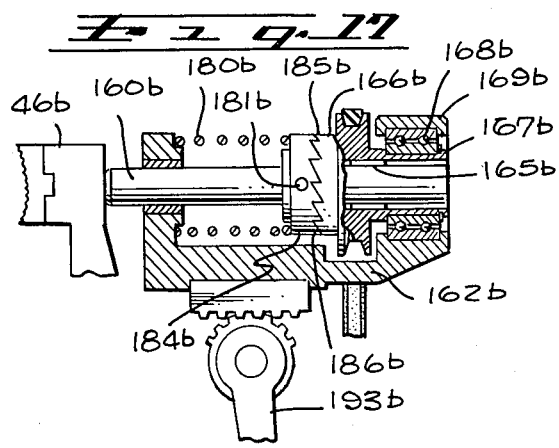
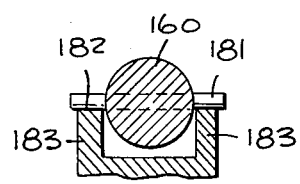

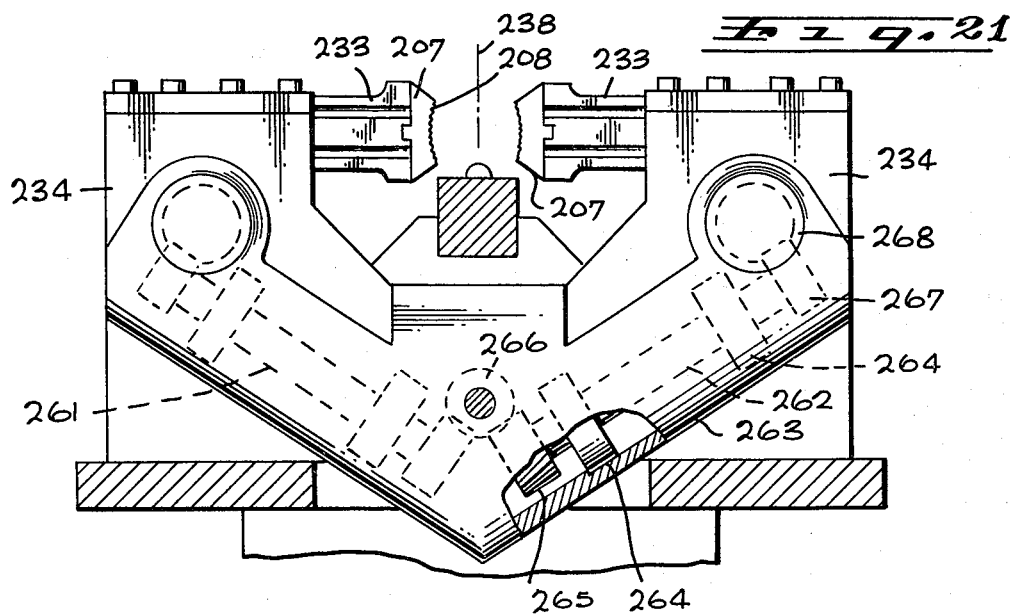
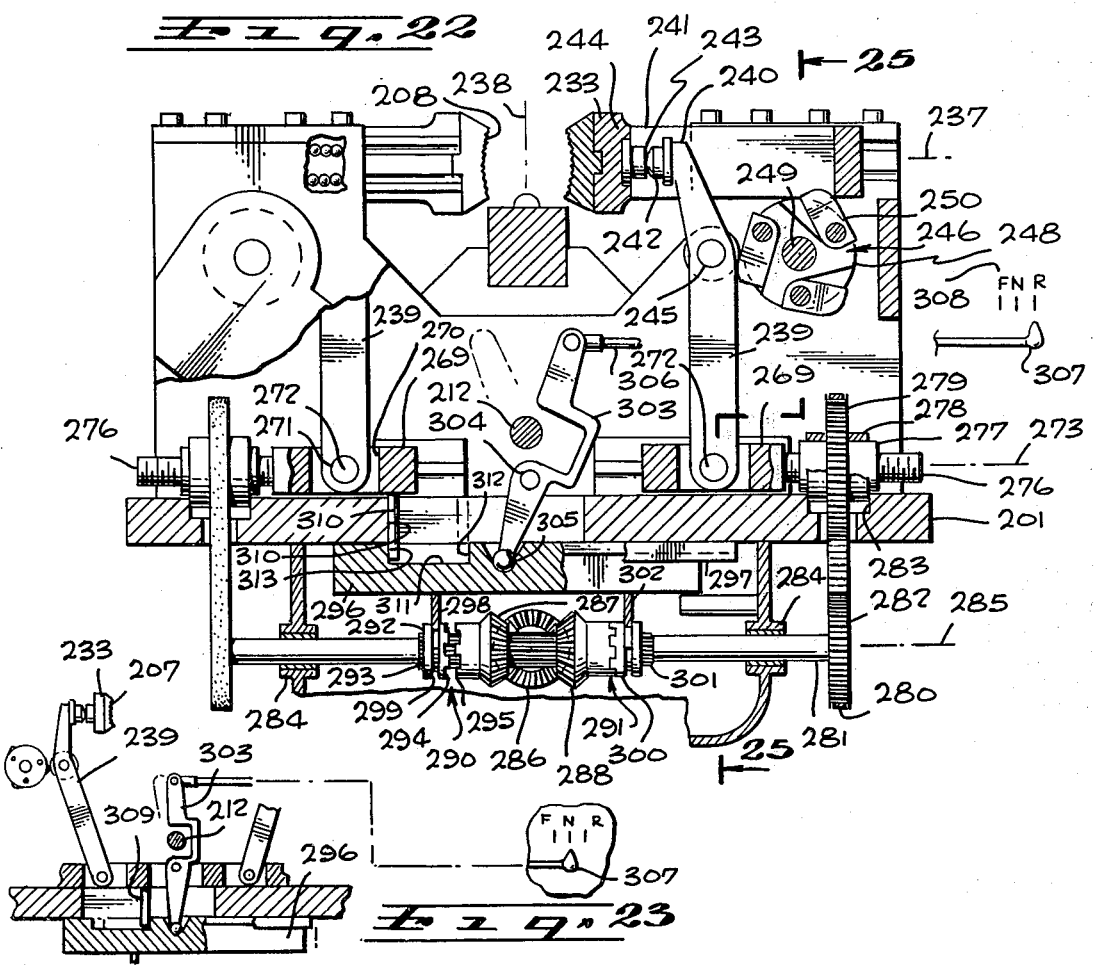

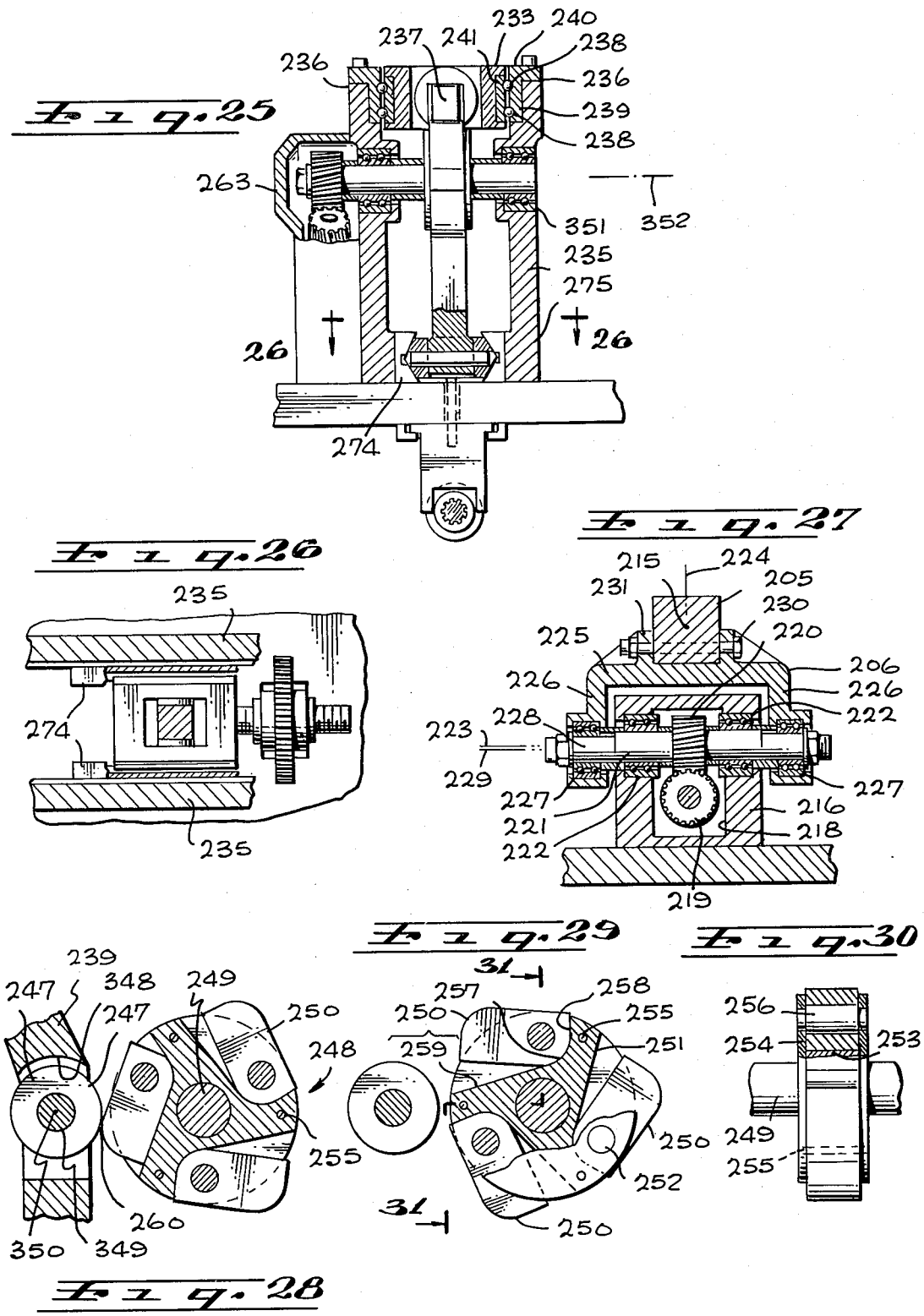

APPARATUS FOR CUTTING PATTERN IN GUN STOCK OR OTHER WORK PIECE

This is a division of application Ser. No. 156,655, filed June 25, 1971.

BACKGROUND OF THE INVENTION

This invention relates to improved apparatus for cutting or engraving an ornamental pattern on the surface of a work piece. To simplify and clarify the disclosure the invention will be discussed primarily as applied to the formation of 'checkering' or other ornamental patterns on a firearm, as for instance on the wooden stock of a rifle or shotgun, or on a metal portion of such a gun, or on the handle of a pistol, though it will be apparent that the invention in its broadest aspects may also be applied to the formation of decorative patterns on other types of work piece.

In the past, the formation of ornamental patterns on gun stocks has been largely a hand operation, performed by very highly skilled artisans in a time consuming and therefore very expensive process. Some automated procedures have been proposed for attempting to produce such patterns without relying on hand labor, but the patterns produced by these processes have been very poor reproductions of a true hand cut pattern, and have been very quickly detectable as in fact not hand produced. For example, certain of these prior processes have relied on burning a 'checkering' pattern into a gun stock with a heated element, or pressing the pattern into a surface, but the appearance of such burned or pressed patterns has been very basically different from a pattern formed by hand controlled cutting tools.

SUMMARY OF THE INVENTION

The apparatus of the present invention is capable of producing a desired pattern on a gun stock, piston handle, or other work piece by a low cost mechanical operation, but in a manner closely simulating hand work. In a pattern formed by the present apparatus, the various lines of the pattern can be given a very sharply defined and precise appearance, far superior for example to the much less accurate and relatively uncontrollable type of pattern which is produced by burning or pressing. In addition, the entire pattern can be produced in a minimum of time, and by a substantially unskilled operator. The invention therefore permits a very drastic reduction in the cost of checkering or otherwise decorating a gun.

To attain these results, I employ a machine having a specially designed cutter which is formed with a large number of cutting edges arranged and contoured in a pattern corresponding to that which is to be provided on the work piece. The apparatus acts to rapidly vibrate this cutter and the work piece relative to one another while the cutter is positioned for engagement with the work piece, so that the cutting edges will function to progressively cut into and form the pattern on the work piece. Preferably, the cutter structure and work piece are simultaneously shifted slightly relative to one another in a second and lateral direction during the vibratory movement, to enhance the effectiveness with which the vibrating cutter can dig into and shape the work piece. For best results, this second type of movement is an orbital motion, in a plane generally parallel to the work surface being positioned, while the vibratory motion is in a direction toward and away from that surface. In conjunction with these vibratory and orbital movements, the cutter and work piece may also be progressively advanced relatively toward one another to slowly or gradually deepen the pattern formed in the work surface.

The vibratory motion may be produced by means of a rotating wheel carrying actuating elements which may act against the cutter structure intermittently to vibrate it. Preferably, the wheel or other vibrating element acts against a cutter driving lever at essentially its fulcrum, while advancement of the cutter is effected by swinging of the lever.

It is contemplated within the broadest aspects of the inventions covered by the present application and its related cases that the different types of relative movement of the cutter and work piece may in some instances be effected by movement of the cutter structure, and in other instances be effected by movement of the work piece itself. The arrangement covered especially by the present application includes apparatus in which the vibratory and advancing movements are desirably attained by displacement of the cutter structure, while the oscillatory or lateral shifting movement is preferably attained by displacement of the work piece itself.

BRIEF DESCRIPTION OF THE DRAWING

The above and other features and objects of the invention will be better understood from the following detailed description of the typical embodiments illustrated in the accompanying drawings, in which:

FIG. 1 is a perspective view of a gun stock engraving machine which has been covered in parent application Ser. No. 156,655, of which this application is a division;

FIGS. 2 and 3 are enlarged perspective and plan views of the FIG. 1 machine with the cover broken away;

FIGS. 6, 7, and 8 are vertical sections taken on lines 6—6, 7—7, and 8—8 respectively of FIG. 3;

FIG. 9 is an enlarged fragmentary view of the vibratory hammer unit taken on line 9—9 of FIG. 7;

FIG. 10 is a section taken primarily on line 10—10 of FIG. 9;

FIG. 11 is an enlarged section through the cutting edges taken on line 11—11 of FIG. 6;

FIG. 12 is a side view of a gun stock work piece and its holder, taken on line 12—12 of FIG. 4;

FIG. 13 shows the holder of FIG. 12 in perspective;

FIG. 14 is a side view of another machine which is being covered in another divisional application, which machine is shown with the outer housing removed;

FIG. 15 is a view taken partially on line 15—15 and partially on line 15a—15a of FIG. 14;

FIG. 16 is a section on line 16—16 of FIG. 15;

FIG. 17 is a fragmentary vertical section through a further variational arrangement covered by the divisional application;

FIGS. 21 and 22 are transverse vertical sections taken on lines 21—21 and 22—22 respectively of FIG. 20;

FIG. 23 shows a portion of the apparatus of FIG. 22 in starting position;

FIG. 25 is a vertical section taken on line 25—25 of FIG. 22;

FIG. 26 is a fragmentary horizontal section taken on line 26—26 of FIG. 25;

FIG. 27 is a vertical section taken on line 27—27 of FIG. 20;

FIGS. 28 and 29 are vertical sections through the rotary vibrating element in two different positions; and FIG. 30 is a view taken on line 30—30 of FIG. 29.

DESCRIPTION OF THE PREFERRED EMBODIMENTS

Figure 3:
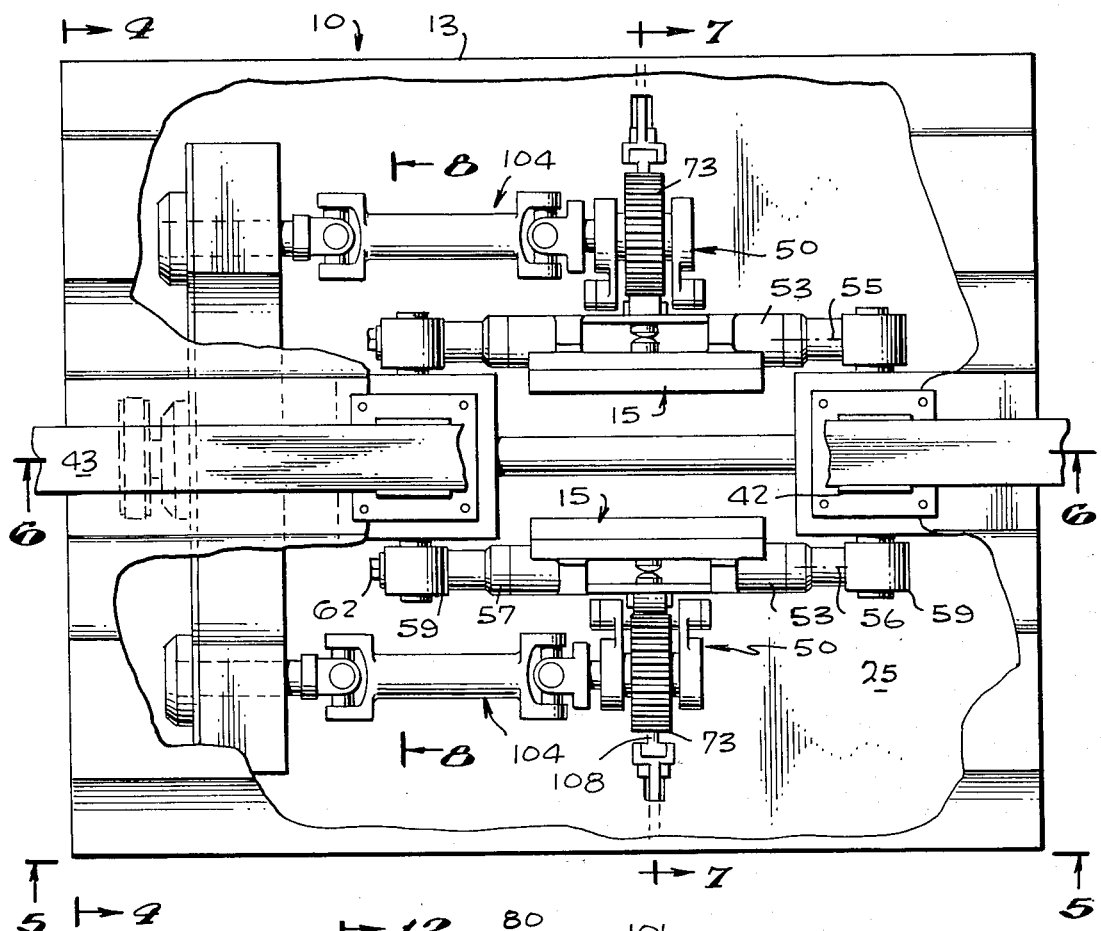

Referring first to FIG. 1, I have shown at 10 a first form of checkering machine covered in parent application Ser. No. 156,655 and designed for cutting a checker pattern or other pattern 11 on the opposite sides of a conventional wooden gun stock 12 of a rifle, shotgun, or other gun. The machine 10 has an outer housing 13 forming an elongated trough or recess 14 within which the gun stock is mounted stationarily at a location to be engaged at its opposite sides by two vibratory cutter elements 15. The housing may be formed of sheet metal or the like bent to the illustrated shape, to form an elongated horizontal bottom wall 16 of the trough 14, and two upwardly diverging opposite side walls 17 and 18 containing apertures 19 through which the cutter elements 15 are connected to actuating mechanism within the interior of the housing. Extending along the upper edges of the two side walls 17 and 18, the housing may have two top horizontal walls 20 and 21 lying in a common horizontal plane, and meeting two downwardly diverging outer side walls 22 and 23. At its opposite ends, the housing has two parallel vertical end walls 24. The transverse cross sectional configuration given to the housing by walls 16, 17, 18, 20, 21, 22 and 23 is illustrated in FIG. 7, and is uniform and unchanging along the entire length of the housing between the two end walls 24, except at the location at which that cross section is interrupted to provide the mentioned apertures 19.

As seen best in FIG. 2, the operating mechanism of the checkering machine 10 may be built up on a rigid horizontal base plate 25, which may be supported in any suitable manner, as for instance by a number of legs 26. The moving parts are all driven by a motor 27 mounted to the underside of base 25, and having a driven shaft and pulley 28 turning about a horizontal axis 29. A belt 30 driven by pulley 28 extends upwardly through an aperture 31 in base plate 25, to engage and drive a second and upper pulley 32 carried by and rigidly attached to a shaft 33 which turns about a horizontal axis 34 extending parallel to motor axis 29.

The shaft 33 is journaled to turn about axis 34 by appropriate bearings, typically including a first pair of spaced bearings 35 mounted within a rigid hollow block 36 at the upper side of plate 25, and a second and similar pair of spaced bearings 37 mounted within a second rigid hollow block 38. The two blocks 36 and 38 are suitably secured to the upper side of base plate 25 in fixed position relative thereto, as by appropriate screws or other fasteners 39. The upper surfaces 40 of the blocks 36 and 38 may extend horizontally in a common plane, so that the previously discussed horizontally extending bottom wall 16 of the gun receiving trough or recess in the upper portion of the housing may rest on surfaces 40 of the two blocks 36 and 38, and be secured thereto, as by screws 41 which may also serve to secure to the blocks a pair of rigid anchors or brackets 42 for retaining an elongated gun stock holder 43 in fixed position.

Holder 43 extends horizontally and longitudinally of the trough 14, and is specially shaped and designed to rigidly hold on its upper surface whatever particular type of gun stock, gun handle, gun action, or other work piece is to be patterned by the apparatus in a particular operation or series of operations. As seen best in FIGS. 12 and 13, the typical holder structure 43 thereshown, for retaining a wooden gun stock, has at its upper side a horizontally elongated upwardly projecting semi-cylindrical rib 140 shaped to fit within the correspondingly semi-cylindrical groove 141 (FIG. 4) in the gun stock which normally receives the gun barrel. Holder 43 also has an upwardly projecting rigid metal block 142 (FIGS. 12 and 13), dimensioned to fit closely within the recess 143 in the stock which normally receives the action of the gun. Thus, with the gun stock inverted, rib 140 and block 142 function together to locate the gun stock in fixed position relative to holder 43 and the rest of the apparatus, which the stock being clamped in that located relation by three appropriate toggle or other clamps 144, 145 and 146 of any convenient conventional construction. Clamps 144 and 145 function to hold the gun stock downwardly at its fore-end and action recess respectively, while clamp 146 may exert forward force against the butt-end of the stock. Clamp 145 may be detachably connectible to block 142, as by means of an anchoring element 147 having a lower enlargement or head which engages block 142 in a detachable bayonet type connection. Thus, the stock may be easily removed from holder 43 by merely releasing the three clamps, and drawing clamp 145 upwardly out of the path of removal of the gun stock from holder 43.

The two cutters 15 have inner cutting surfaces 46 which are contoured as seen in FIGS. 2 and 7 to follow the curvature of engaged opposite side surfaces of the gun stock which is to be checkered. Each of the cutting faces 46 has a large number of elongated cutting edges 47 (FIG. 11) which are adapted to cut into the wood of the gun stock. When the pattern to be formed on the stock is a checkered or criss-cross pattern, the cutting edges 47 include a first series of essentially parallel edges extending in a first direction, and a second series of essentially parallel edges extending in a second direction and intersecting the first set in the desired checker pattern. When the surface 48 to be checkered is non-planar, the peaks 47 of the cutting edges do not lie in a common plane, but rather are themselves contoured to all contact the surface 48 in the same position of the cutter.

Each of the cutters 15 may be horizontally elongated as indicated, and may be attached rigidly to a correspondingly elongated mounting number 49 secured to the upper end of a swinging arm 50. The arm 50 may typically be cast to the illustrated configuration, having two spaced parallel upwardly projecting portions 51 typically interconnected by a cross-piece 52. The cutter mounting member 49 at the upper end of each arm 50 may be cast integrally with the arm, as may a lower mounting sleeve 53 which is carried movably about a horizontal externally cylindrical shaft 54. The two shafts 54 associated with the two cutter elements 15 respectively extend parallel to one another, at opposite sides of the two blocks 36 and 38, and have their axes 55 and 56 disposed horizontally. The two shafts 54 and the sleeves 53 thereabout thus form two hinge structures mounting the two arms 50 and their carried cutters 15 for swinging movement about the two axes 55 and 56 respectively, to thus move the cutters toward and away from the gun stock. Axes 55 and 56 extend essentially parallel to the opposite side surfaces of the gun stock which are to be checkered, so that the swinging movement moves the cutters into and out of engagement with those surfaces.

Figure 5:
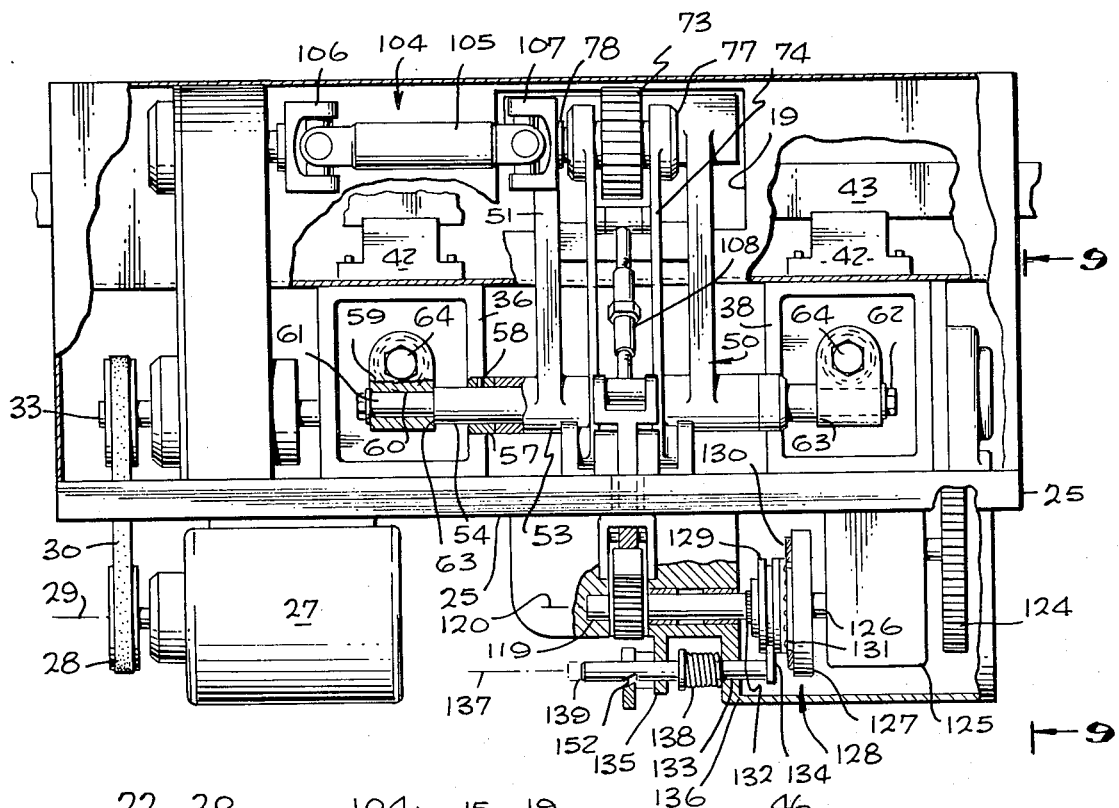

The sleeves 53 and their attached cutters are held against movement axially of shafts 54 in suitable manner, as by provision of a pair of collars 57 on each of the shafts 54 at opposite ends of the associated sleeve 53, with these collars being appropriately retained in fixed axial position as by set screws such as the one represented at 58 in FIG. 5.

Each of the shafts 54 is rigidly connected at its opposite ends to a pair of mounting elements 59, which may have passages 60 through which reduced end portions 61 of the shaft may extend, with nuts 62 being threadedly connected onto the ends of the shaft to tightly retain each element 59 against a shoulder 63 on the shaft.

The mounting elements 59 for the two shafts 54 are mounted to and actuated by a pair of transverse eccentric shafts 64 (FIGS. 5, 6, 7 and 8), which extend through blocks 36 and 38 respectively (FIG. 6), and are journaled by bearings 65 mounted in the blocks. Between the two bearings 65 in each block, the associated shaft 64 has a gear 66 which engages a gear 67 mounted on the previously discussed main shaft 33 in a relation continuously driving each shaft 64 so long as shaft 33 is turning. Bearings 65 mount shafts 64 to turn about two axes 68 which extend parallel to one another and perpendicular to a vertical central plane 69 extending along the center of trough 14 (and containing axis 34 of main shaft 33). At its opposite ends, each shaft 64 has an eccentric cylindrical portion 69, whose axis 70 extends parallel to but is offset from the main axis 68 of the shaft. These eccentric portions 69 of each shaft 64 are journaled rotatively within bushings 71 contained within bores formed in the previously discussed cutter mounting elements 59, with the latter being retained on the shafts by nuts 72, so that as shafts 64 turn, the mounting elements 59 more orbitally about axis 68, and correspondingly move the cutters 15 in the same small radius orbital pattern. The extent of such orbital movement, and the eccentricity of the end portions 69 of shafts 64, have been greatly exaggerated in the drawings, in order to facilitate an understanding of the invention. Actually, the eccentricity and the total range of orbital movement of the cutters are very small, the diameter of the orbital movement preferably being not over about 15 thousandths of an inch (optimally between about 5 and 10 thousandths). In order to avoid destruction of the checkered pattern as a result of this movement, it is preferred that the minimum spacing s between successive cutting edges 47 of the checker pattern or other pattern to be formed (FIG. 11) be several times as great as the diameter d (FIG. 8) of the orbital movement (FIG. 8) of elements 59 and the cutters.

To give the cutters vibratory movement in addition to the discussed orbital movement, there are provided two toothed actuating wheels 73 at the outer sides of the cutters. These wheels 73 are mounted rotatively to the upper ends of two arms 74 which are hinged at their lower ends by pivot connections 75 to swing toward and away from the gun stock about two parallel horizontal axes 76. These axes extend parallel to and are spaced outwardly from the axes 55 and 56 of shafts 64. Each arm 74 may have two portions 77 received at opposite sides of the associated wheel 73, and containing bearings which journal a shaft 78 to which the wheel 73 is rigidly connected. These bearings mount the wheel 73 to turn about an axis 79 which is horizontal and parallel to the hinge axis 76 of the wheel mounting arm 74. As will be apparent, the axes 79 of the two wheels 73 are parallel to one another, and parallel to the vertical center plane 69 of FIG. 8.

Wheels 73 are driven continuously during operation of the apparatus, by mechanism which will be discussed at a later point, and serve to vibrate a pair of hammer assemblies 80 (FIG. 10) to repeatedly strike co-acting anvils 81 formed at the back sides of the cutter carrying members 49, to thereby vibrate the cutters toward and away from the work piece. Each hammer assembly 80 includes an element 82 whose lower end is connected rigidly as by one or more screws 83 to cross piece 52 of the associated cutter mounting arm 53. The element 82 forms a resilient spring arm 84 projecting upwardly from cross piece 52, and carrying an upper portion 85 of element 82 to which a follower roller 86 is mounted for rotation about an axis 87 extending parallel to axes 76 and 79. Roller 86 may be received within a recess 88 formed in the back side of portion 85 of element 82, while the front side of that element may have a hammer projection 89 typically rounded as shown, and positioned to strike the correspondingly typically rounded anvil 81 attached to the cutter. The teeth 90 of each wheel 73 may all be identical and have the configuration illustrated in FIG. 10, to present gradually radially advancing leading sides 91 which act to deflect the hammer assembly leftwardly in FIG. 10, followed by more abrupt radially extending trailing sides 92 which allow the hammer to return rightwardly in abrupt fashion after it has passed each tooth. The rate of rotation of each wheel 73, and the spacing of its teeth, are predesigned to actuate hammer assembly 80 leftwardly at a frequency corresponding to the natural frequency of vibration of the hammer assembly flowing from the resilience of its spring arm portion 84, so that in operation the hammer assembly is vibrated with minimum expenditure of energy. On each leftward movement in FIG. 10, the hammer assembly strikes anvil 81 to cause leftward displacement of the associated cutter 15 against the gun stock, while upon each rightward movement of hammer assembly 80 in FIG. 10, the hammer portion 89 moves out of engagement with anvil 81 in preparation for the next striking motion.

Figure 4:
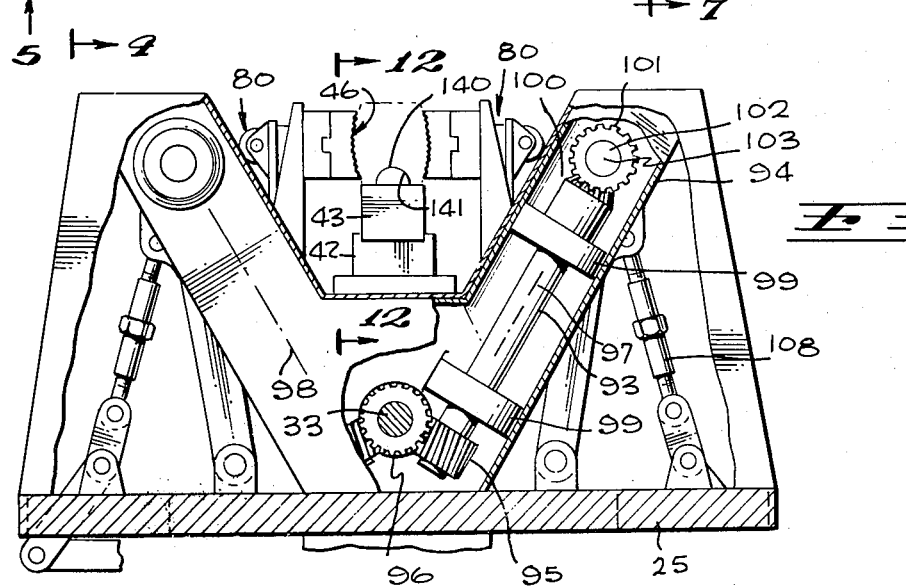
FIGS. 4 and 5 are end and side views respectively taken on lines 4—4 and 5—5 of FIG. 3.

As will be understood best from FIGS. 2, 4 and 5, the mechanism for driving toothed wheels 73 includes two upwardly diverging shafts 93 which are mounted within an essentially V-shaped housing 94 contained within one end of the main housing 13 of the apparatus. These two shafts 93 have gears 95 connected to their lower ends and engaging a common gear 96 on shaft 33, to turn shafts 93 continuously about their individual upwardly diverging axes 97 and 98 (FIG. 4). The shafts 93 are journaled for rotation about these axes by appropriate bearings 99. At its upper end, each shaft 93 has a bevel gear 100 which engages a co-acting gear 101 on a shaft 102 mounted to turn about a horizontal axis 103 disposed parallel to and approximately aligned with the axis 79 of the associated toothed wheel 73. Between shaft 102 and shaft 78 of the associated wheel 73, there is provided a suitable flexible drive connection 104, including an intermediate short shaft 105, and two universal joints 106 and 107 which act to transmit continuous rotation to the associated wheel 73 while allowing swinging movement of that wheel toward and away from the gun stock.

To actuate the rotating wheels 73 toward and away from the hammer assemblies 80, there is connected to the arm 74 which mounts each wheel 73 an adjustable length link 108, which is pivoted at its upper end 109 to arm 74, and at its lower end 110 to an arm 111 of a bell crank 112 pivoted to base plate 25 at 113. The second arm 114 of the bell crank projects downwardly through an aperture in plate 25 for pivotal connection at 115 to the end of a second adjustable link 116, whose opposite end is pivoted at 117 to an actuating arm 118 which is rigidly connected to a shaft 119, and is turned by that shaft between the broken line and full line positions of FIG. 7. Such swinging movement of each of the arms 118 actuates the corresponding bell crank 112 and connected parts including the associated toothed wheel 73 between retracted positions corresponding to the broken line positions of the righthand crank and wheel in FIG. 7, and the full line active positions of the two cranks and associated wheels in that Figure. It is noted that in the fully actuated active positions of these parts, the linkage formed by link 108 and arm 111 of the bell crank is in an approximately 'center' position, in which pivot connection 110 is directly between pivot connections 109 and 113. Similarly, in that same fully actuated active position, the linkage formed by elements 116 and 118 is in an approximately 'center' position, in which pivot point 117 is approximately directly between pivot point 115 and the axis of shaft 119. Links 108 and 116 may be adjusted to obtain approximately these center conditions, or a slightly over-center condition, at the end of the travel of the linkage. As will be apparent, the axes of the various pivotal connections at 109, 110, 113, 115 and 117 are all parallel to one another and horizontal, and parallel to axes 55, 76, 79, etc., and the axis 120 of shaft 119.

The shaft 119 to which one of the arms 118 is mounted is driven through a reduction gear and clutch arrangement illustrated in FIG. 5. The shaft 121 to which the second arm 118 is mounted turns about an axis parallel to axis 120 of shaft 119, and is driven by shaft 119 through two meshing gears 122 attached to the two shafts 119 and 121 (FIG. 7), so that the two arms 118 swing in unison but reversely between their broken line and full line positions of FIG. 7.

Figure 6:
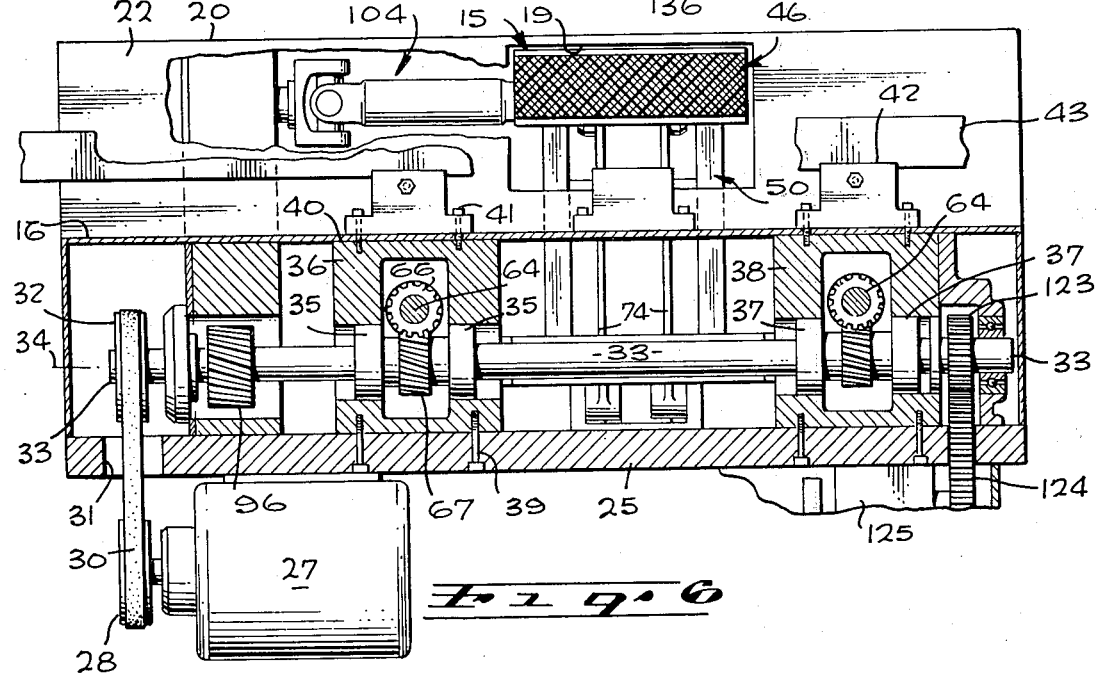

As seen best in FIG. 6, the drive for shaft 119 is taken off of a rear portion of shaft 33 by means of a gear 123 carried by the shaft and meshing with a second gear 124 connected to the input shaft of a reduction gear assembly typically represented at 125. The output shaft 126 of reduction gear assembly 125 rigidly carries a first half 127 of a clutch 128 whose second half or section 129 is adapted to drive the previously mentioned shaft 119 of FIG. 7. Section 127 of the clutch may typically have teeth 130 at its left side in FIG. 5, which are engageable with teeth 131 formed on the second section 129 of the clutch when section 129 is shifted rightwardly to its active FIG. 5 position. Section 129 is retractable leftwardly out of driven engagement with the teeth of section 127, to break the clutch connection so that shaft 119 is no longer driven by the output shaft 126 of reduction gear assembly 125. To enable such axial movement of clutch section 129, this section is splined at 132 to shaft 119, in a manner enabling axial movement of section 129 relative to shaft 119 while at the same time keying these parts together rotatively. For shifting section 129 axially, there is provided an actuating shaft or rod 133 having a lug 134 projecting into a peripheral groove in section 129 to control its axial positioning, with shaft 133 being mounted at 135 and 136 for longitudinal sliding movement along its axis 137 (parallel to axis 120) between the full line and broken line positions of FIG. 5. A coil spring 138 yieldingly urges shaft or rod 133 leftwardly in FIG. 5, to release clutch 128.

The end 139 of clutch actuating shaft 133 projects to the outside of the apparatus to a location accessible to an operator, so that an operator may manually press the shaft inwardly (rightwardly in FIG. 5) to commence a feeding operation. For retaining the actuating shaft 133 in that rightwardly displaced position, there is provided a latch arm 148 (FIGS. 5 and 7), which is pivoted at 149 to swing upwardly between the full line and broken line positions of FIG. 7. When latch arm 148 is in its broken line position of FIG. 7, a latching portion 151 of arm 148 is received within a notch 152 formed in the underside of shaft 133, in a relation releasably holding element 133 in its rightward clutch-engaging setting. A spring 153 (FIG. 7) yieldingly holds latch part 148 in its upwardly actuated position of reception within notch 152 whenever shaft 133 is pressed inwardly (to the right in FIG. 5) far enough for latch element 148 to be spring pressed upwardly into notch 152.

When the arms 118 of FIG. 7 reach the end of their range of travel between the broken line and full line positions of that figure, the outer end of one of the arms 118 engages a vertical plunger or pin 154, which is mounted within a guideway 155 for upward and downward displacement, and which when actuated downwardly by arm 118 correspondingly displaces downwardly latch element 148 from its broken line active position to its full line released position of FIG. 7. Spring 153 is strong enough to maintain pin 154 in an upwardly displaced position whenever latch element 148 is in its broken line position of FIG. 7, and until arm 118 forcibly presses pin 154 downwardly.

The final portion of the swinging movement of toothed wheels 73 and the associated parts toward their full line positions of FIG. 7 is resisted by two compression springs 156 which return the wheels 73 and associated parts to their broken line positions as soon as clutch 128 has been automatically released by pin 154. In order to break the knee of the over-center or approximately over-center linkages 116–118, the final portion of the swinging movement of arms 118 may also be resisted by a plunger 157 (FIG. 7) which is yieldingly urged upwardly by a compression spring 158 at a location to be engaged by the end of one of the arms 118 as it completes its travel, so that as soon as clutch 128 is released, spring pressed plunger 157 displaces the associated arm 118 upwardly far enough to move it well beyond the center position range, and also cause corresponding knee breaking movement of the other connected arm 118.

To now describe a cycle of operation of the apparatus shown in FIGS. 1–11, assume that a gun stock to be checkered has been placed on holder 43 in the inverted condition illustrated in FIG. 12, and that the operator has then clamped the gun stock in position on the holder by means of the three previously described clamps 144, 145 and 146. Assume also that the main motor 27 of the apparatus has been energized to continuously turn at a predetermined rate the main drive shaft 33. This drive shaft acts through shafts 93 and the connected flexible drives 104 to continuously turn the two toothed wheels 73, but with those wheels retained outwardly in a position corresponding to the broken line position of the right hand wheel in FIG. 7 by the two springs 156. The main shaft 33 also functions to drive cross-shafts 64 which act by their eccentric end portions 69 to oscillate cutters 46 and their connected parts orbitally, but without those cutters being urged against the gun stock.

To commence a checkering operation, the operator presses actuating shaft 133 rightwardly against the tendency of spring 138 and until shaft 133 reaches a position in which latch part 148 is spring urged upwardly into notch 152 to hold element 133 against release. In this setting, clutch 128 acts to transmit power from the continuously rotating output shaft 126 of reduction gear assembly 125 to shaft 119, at a rate to slowly turn the shaft in a clock-wise direction as viewed in FIG. 7, and thereby slowly swing arms 118 from their broken line positions of FIG. 7 to their full line positions of that figure. Such swinging movement of arms 118 acts through the link 116, bell crank 112 and link 108 to gradually swing the two wheels 73 inwardly toward the work piece, and to correspondingly feed cutters 46 gradually against the work piece. During such advancement, the engagement of the teeth of wheels 73 successively with the following rollers 86 of the hammer assemblies 80 vibrates those hammer assemblies at their natural sympathetic frequency, and causes them to repeatedly strike anvils 81, and thereby cause vibratory movement of the cutters toward and away from the engaged surfaces of the work piece. This movement of the cutters causes them to gradually cut patterns in the opposite sides of the gun stock corresponding to the patterns of the cutting edges on the cutters themselves. The very slight orbital movement of the cutters during their advancement and vibratory motion causes the cutters to shift very slightly to different positions relative to the gun stock, in a manner facilitating the cutting action and reducing the removed material to the form of a fine powder, while not appreciably altering the pattern formed on the gun stock because of the very slight range of the orbital movement as compared with the much greater spacing between the successive cutting edges of the cutters. Because of the design of the feed linkage to approach a 'center' position, as discussed, at the end of the range of feeding movement, the last portion of the travel of the toothed wheels and cutters is very slow, and permits a very gradual and finely controllable final finishing action. When the end of the travel of the toothed wheels 73 and related parts is reached, one of the arms 118 acts through plunger 154 to release latch element 148, and thus halt advancement of the wheels 73 and related parts, and enable retraction of those parts under the influence of springs 156, with the initial portion of the retraction being facilitated by spring 158 which breaks the knee of the over-center or almost over-center linkages between arms 118 and links 116. The inner-most positions of the cutters themselves may be further accurately predetermined by providing the holder mounting blocks 42 with laterally projecting stop elements 159 engageable by members 50 (FIG. 7) in the final cutting positions of cutters 46. Stops 159 may take the form of screws having adjustable heads or nuts mounted thereon engaging parts 50.

After completion of a cutting operation, the stock may be moved to a second position on holder 43 for cutting additional checkering on the stock, with appropriate clamping means being utilized for holding the stock in that second position, or the stock may be removed from the holder and replaced by a second stock to be checkered or otherwise patterned.

The machine shown in FIGS. 14–16 is essentially the same as that of FIGS. 1 to 13 except as to the manner in which the cutter elements 46a (corresponding to cutters 46 of FIGS. 1 to 13) are vibrated. As in FIGS. 1 to 13, these cutters are mounted on oscillating swinging arms 50a (corresponding to arms 50), which swing toward and away from the work piece about two shafts 54a mounted eccentrically to the ends of a pair of cross-shafts 64a corresponding to shafts 64 in the first form.

Associated with each of the cutters 46a, there is provided a hammer element 160, taking the form essentially of an elongated shaft extending and movable along an axis 161 which is disposed substantially perpendicular to the faces of the cutters 46a, and therefore substantially perpendicular to the surfaces of the gun stock or other work piece to be patterned. Hammer 160 is mounted for movement along axis 161 relative to a carrier part 162, by providing an upstanding wall 163 of the carrier part with a sleeve bushing 164 slidably guiding shaft 160 at a first end thereof, and by providing a needle bearing or other bearing 165 slidably locating the opposite end of shaft 160 within a rotatable pulley 166. This pulley 166 has a tubular projection 167 which is journaled by a ball bearing 168 within an upstanding second portion 169 of carrier structure 162. The ball bearings 168 are of the thrust bearing type acting to prevent axial movement of pulley 166 relative to carrier part 162. The pulleys 166 associated with the two hammer elements 160 respectively are driven continuously by the main motor 27a of the apparatus (corresponding to motor 27 of the first form of the invention), through a shaft 33a corresponding to shaft 33 of the first form. More particularly, shaft 33a may drive a counter-shaft 170 (FIG. 14) through a gear train represented at 171 in FIG. 14, with shaft 170 in turn acting through a gear 172 (FIG. 14) to drive continuously a cross-shaft 173 mounted by bearings 174 at the underside of main base plate 25a of the apparatus. Shaft 173 carries pulleys 175 at its opposite ends which are internally splined and mounted on externally splined portions 176 of shaft 173 to enable axial movement of pulleys 175 parallel to the common axis 161 of the hammer elements 160 while continuously transmitting rotation from shaft 173 to pulleys 175 and through connected belts 177 to hammer actuating pulley 166. As will be understood, pulleys 175 automatically move along their splined drive structures 176 in correspondence with movement of hammers 160 along their longitudinal axis 161, which axis is parallel to the axis 178 of shaft 173.

Each of the hammer elements 160 has a circular transverse enlargement 179 near its inner end, received between the two upstanding portions 163 and 169 of the corresponding carrier part 162, and urged yieldingly toward the work piece by a co-acting compression coil spring 180 interposed between upstanding portion 169 and the shoulder or portion 179. Two lugs 181 project horizontally outwardly at diametrically opposite locations from the periphery of flange 179, and are engageable with the upper edges 182 of two side wall portions 183 (FIG. 16) of carrier part 162, to retain each hammer 160 against rotation about its axis 161.

At its outer end, each hammer 160 has an enlarged circular transverse head 184, which is shaped at its axially inner side to form a series of circularly spaced identical ratchet like camming teeth 185 engageable with and shaped in correspondence with a similar series of opposed teeth 186 formed at the outer end of pulley 166. Each of these teeth may be defined by a first face 187 disposed essentially parallel to axis 161, and a second face 188 which advances gradually and progressively in an axial direction as it advances circularly. Thus, as will be understood, when one of the pulleys 166 is turned about its axis 161 in a predetermined direction, the camming faces 188 of the engaged teeth of hammer element 160 and pulley 166 act to first gradually cam hammer 160 axially away from the associated cutter 36a and the work piece, and then suddenly release the hammer element for movement against the back side of the cutter element or the carrying arm 50a under the influence of spring 180, to produce a sharp hammering action against the cutter and thus produce a sharp hammering action by the cutter against the work piece.

During the discussed hammering or vibratory movement of elements 160, these elements and their carrier part 162 are progressively advanced inwardly toward the work piece. To enable such advancement, each of the carrier parts 162 is mounted movably to the upper end of an associated hollow support column 189, having ways 190 at its upper end mounting the associated carrier part 62 for sliding movement parallel to axis 161. At its underside, each carrier part 162 has a toothed rack 191 which is engageable with and actuated by a gear 192 formed on the upper end of an actuating arm 193 mounted to swing about a horizontal shaft 194 secured to the associated column 189. As will be apparent, the axis of shaft 194, and therefore the swinging axis of arm 193, extends parallel to the axis of the main shaft 33a of the apparatus. The lower ends of the two arms 193 associated with the two cutters 46a are pivotally connected at 195 to links 116a corresponding to links 116 of FIG. 7, which are in turn connected at 117a to arms 118a corresponding to arms 118 of FIG. 7. The clutch mechanism for driving arms 118a is the same as shown at 128 in FIG. 5, as is the latch element 148a (corresponding to latch 148 of FIG. 7) and its related parts. Instead of the return springs 156 of the first form, there may be provided a spring 156a associated with each of the arms 193 and disposed about a pin 196 which is connected at one end 197 to the associated arm 193 and which extends at its opposite end through an aperture 198 in a sidewall of the corresponding support column 189. The spring 156a is maintained under compression between an enlargement on pin 196 and the sidewall of the column 189, to thus continuously urge arm 193 in a direction to retract the associated carrier part 162 and hammer element away from the work piece. As in the arrangement of FIGS. 1 to 13, the knee of the over-center linkage 116a-118a may be broken by a spring pressed plunger or pin 157a.

In using the apparatus in FIGS. 14–16, pulleys 166 are continuously driven rotatively and thus continuously vibrate hammer elements 160 leftwardly and rightwardly as viewed in FIG. 15. When the clutch 128 of FIG. 5 is actuated to its active condition, it causes arms 118a to gradually swing in the same manner discussed in connection with FIG. 7, to thus correspondingly swing arms 193 in a manner acting through gears 192 and racks 191 to gradually advance the carrier parts 162 and associated vibrating hammers 160 toward the work piece and toward one another. The hammers apply this vibratory motion to the backside of cutters 46a, which are thus vibrated while in contact with opposite sides of the gun stock, and are gradually advanced during such vibration. At the same time, the orbital oscillation of the cutters co-acts with the vibratory movement to attain a highly effective overall cutting action producing on the work piece a pattern corresponding to that defined by the cutting edges of cutter elements 46a. When arms 118a reach the end of their travel, one of them actuates plunger 154a to release latch element 148, and thus interrupt the drive to the advancing mechanism, and allow spring urged return of carrier parts 162 and the related elements to their initial positions out of contact with the work piece. The work piece may then be replaced or shifted for the next successive checkering or other patterning operation.

FIG. 17 shows fragmentarily another arrangement which may be considered as identical with that of FIGS. 14–16 except that the coil spring 180b acts to retract rather than advance the hammer element 160b, while the engaging teeth 185b and 186b on hammer carried flange 184b and pulley 166b act to positively advance hammer 160b leftwardly in its striking direction against the backside of the cutter element 46b or its mounting structure. As in FIG. 15, the pulley is mounted within a portion 169b of the carrier part 162b by means of thrust taking type ball bearings 168b within whose inner race a tubular projection 167b of the pulley is received. The outer portion of hammer element 160b is mounted within the pulley by needle bearings 165b. Diametrical horizontally projecting lugs 181b, corresponding to lugs 181 of FIGS. 14–16, may engage edge surfaces of a sidewall as at 182 in FIG. 16 to prevent rotation of hammer element 160b.

During an operation of the FIG. 17 arrangement, swinging movement of arm 193b gradually advances carrier part 162b leftwardly in FIG. 17, while the hammer element 160b is being repeatedly vibrated parallel to its axis by teeth 185b and 186b, and during oscillatory orbital movement of the cutter elements as previously discussed, to attain again an extremely effective cutting action.

Figure 18:
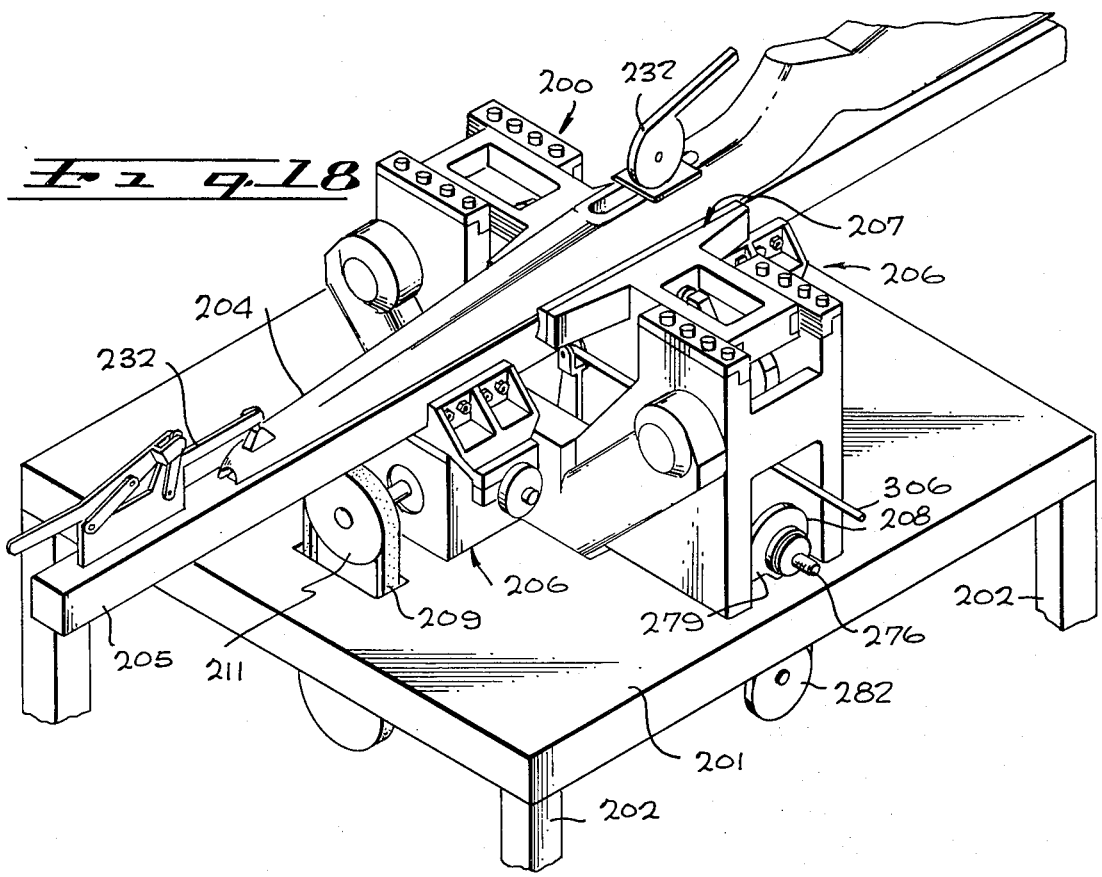
FIG. 18 is a perspective view of the machine covered by the present application.

To describe now the machine of FIGS. 18 through 31, with which the present present divisional application is particularly concerned, and with reference first to the perspective representation of FIG. 18, the checkering or engraving machine 200 thereshown includes a rigid horizontal base plate 201 mounted on legs 202 or any other supporting structure and having a motor 203 mounted to the underside of base plate 201 for driving the various operating mechanisms of the machine. The gun or other work piece 204 is detachably but rigidly connected to the upper side of an elongated rigid holder 205 which is in turn carried by and orbitally oscillated by two mounting parts 206. A pattern is cut or engraved on the opposite sides of the wooden stock or other desired portion of work piece 204 by means of two cutter elements 207 which are vibrated relative to the work piece and having cutting edges 208 at their inner sides defining the desired pattern to be formed on the gun stock.

Figure 24:
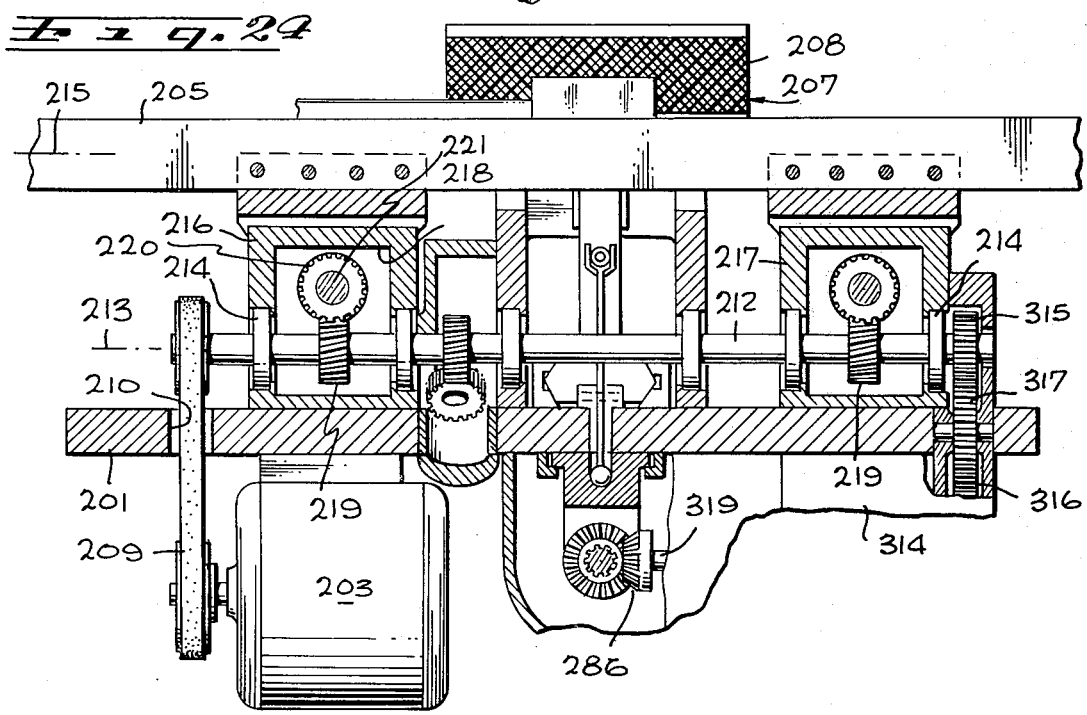
FIG. 24 is a central vertical section taken on line 24—24 of FIG. 20.
Figure 19:
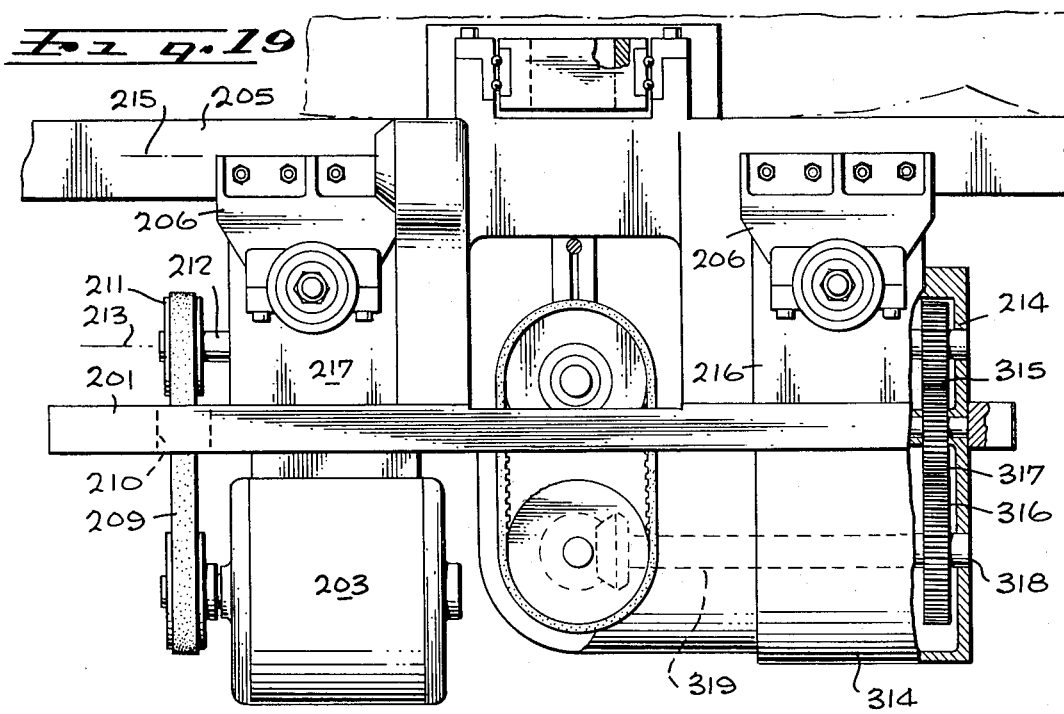
FIG. 19 is a side view of the FIG. 18 apparatus, taken on line 19—19 of FIG. 18.
Figure 20:
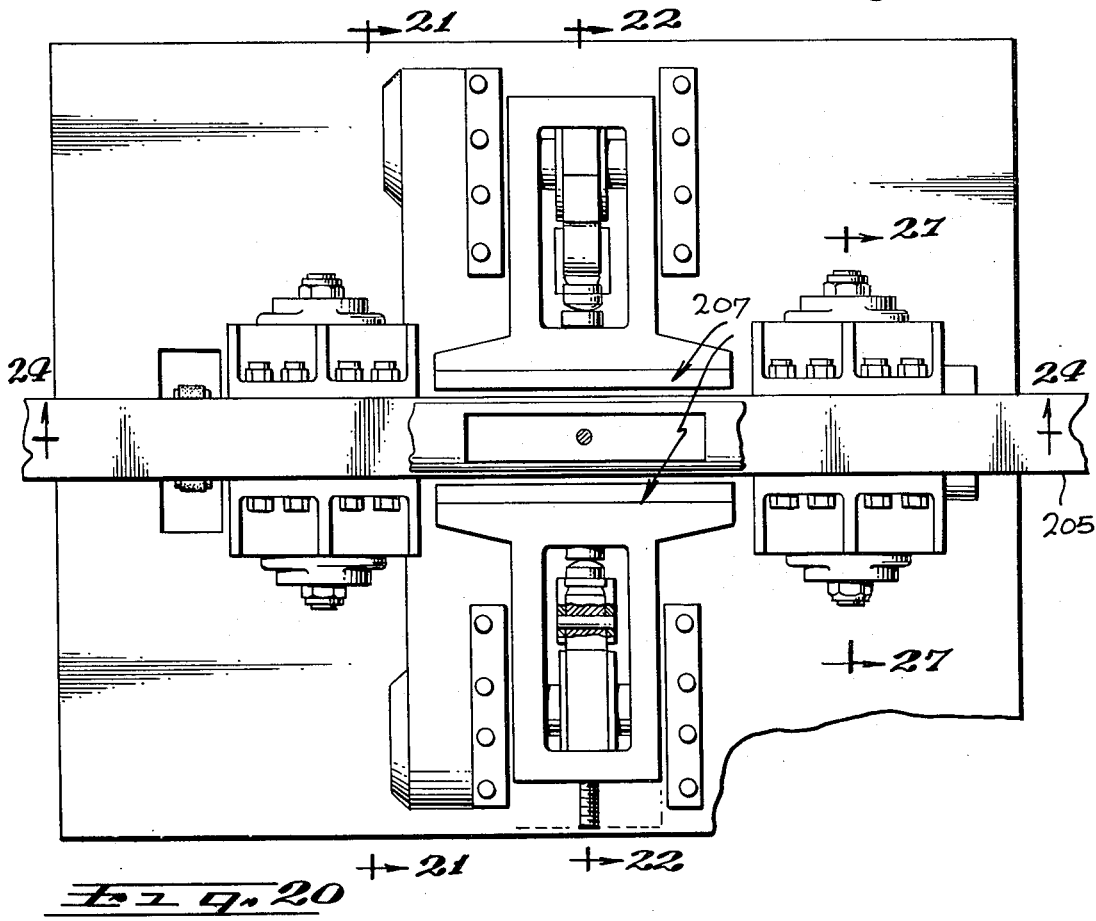
FIG. 20 is a plan view of the FIG. 18 unit.

As best seen in FIG. 19, the drive from motor 203 is taken through a belt 209, which extends upwardly through an aperture 210 in base plate 201 and acts through a pulley 211 to drive an elongated shaft 212 about a horizontal axis 213. Shaft 212 is journaled for rotation about that axis by appropriate bearings 214 (FIG. 24). Axis 213 is located directly beneath and parallel to the longitudinal axis 215 of the work holding part 205.

At the locations of the two parts 206 which gun holder 205 is mounted, there are provided two rigid hollow support columns or parts 216 and 217 (FIGS. 24 and 27), which are suitably connected rigidly to and project upwardly from base plate 201, and which may carry the bearings 214 by which shaft 212 is journaled. Shaft 212 extends through the central cavity 218 of each of these support columns 216 and 217, and in each of the columns carries a helical gear 219 driving a second helical gear 220 (FIG. 27) attached to an associated transverse shaft 221 journaled by bearings 222 for rotation about an axis 223. The two axes 223 of the two shafts 221 are spaced horizontally apart and are parallel to one another, and lie in a common horizontal plane. These two axes 223 are also perpendicular to a vertical plane 224 containing the previously mentioned longitudinal axes 213 and 215.

The two holder mounting parts 206 extend about the upper portions of the two stationary mounting columns 216, as seen in FIG. 27, with each part 206 having an upper horizontal portion 225 and two downwardly projecting portions 226 at opposite sides of the corresponding support column 216 or 217 to carry bearings 227 within which opposite end portions 228 of shaft 221 are rotatably journaled. The end portions 228 of each shaft 221 are externally cylindrical but centered about an eccentric axis 229 which is parallel to but offset slightly from the main axis 223 of shaft 221. This eccentricity of the end portions 228 of each of the shafts 221 thus causes an orbital oscillation of both of the parts 206 and the carried gun 204 upon rotation of main shaft 212 by motor 203. The eccentricity of each shaft 221 is identical with and offset in the same direction as the other of the two shafts 221, so that the orbital movements of the two parts 206 are identical, and the entire holder 205 and carried gun moves bodily in an oribital manner without altering the orientation of the holder and gun. The range of orbital movement is very slight, and in particular is small as compared with the spacing between adjacent cutting edges on cutters 207 so that the orbital movement does not destroy or appreciably alter the pattern being cut in the work piece. Holder 205 may be secured to the two mounting parts 206 in any appropriate manner, as by means of a number of bolts or screws 230 extending through the holder and through upstanding flanges 231 on parts 206, and securing holder 205 rigidly to parts 206. At its upper side, the holder may carry any appropriate type of releasable clamps 232 by which the work piece 204 may be secured rigidly to the holder.

The two cutter elements 207 are contoured in correspondence with the opposite sides of the work piece, as seen in FIG. 21, and are secured to two carriers 233, which are mounted slidably by two similar upstanding rigid frame members 234 appropriately secured to base plate 201. As seen in FIG. 25, each frame member 234 has two spaced essentially parallel vertical side walls 235 having upper portions 236 forming a guideway guiding the associated cutter carrier 233 for sliding movement horizontally along an axis 237 disposed perpendicular to vertical central axis 238 containing the previously mentioned primary axes 212 and 215. The axis of sliding movement 237 of each of the cutter carriers 233 is the same axis as that along which the other of the two cutters moves relative to its associated frame member 234. To minimize the resistance to sliding movement of the cutter carriers, each of the carriers may be mounted for its sliding movement by four horizontal series of ball bearings 238, received and confined within opposed grooves 239 formed in bearing plates 240 and 241 carried by parts 235 and 233 respectively.

The two cutter carriers 233 are actuated vibrationally toward and away from the work piece and along axis 237, and also advanced progressively toward the work piece along that axis by means of two generally vertical levers 239 which have upper ends 240 projecting upwardly into vertical passages or openings 241 formed in carriers 233. The upper end of each lever may have a rounded typically spherically curved hammer surface 242 which is adapted to strike a transverse vertical surface 243 formed at the backside of a vertical front wall portion 244 of the corresponding carrier 233. Levers 239 are mounted for swinging movement about fulcrum axes 245 intermediate the upper and lower ends, with these two axes of the two levers being parallel to one another and to axes 213 and 215 and being parallel to and spaced equally in opposite directions from vertical central plane 238 of the machine. As will be apparent, swinging movement of the two levers 239 between their FIG. 23 and FIG. 22 positions causes progressive advancement of the two cutter carriers 233 relatively toward one another and toward and against opposite sides of the work piece to perform a patterning operation thereon.

The levers 239 and cutter carriers 233 are adapted to be vibrated during the above discussed cutter advancing movement, by means of two rotary vibrating units 246 which act against the levers at essentially the locations of their fulcrums 244. For this purpose, each of the levers 239 may carry an externally cylindrical roller 247 (FIG. 28), typically mounted within a recess 348 formed in the corresponding lever, and mounted rotatably on a pin 349 extending across that recess. The axis 350 of the roller 247 coincides with the fulcrum axis 245 of the lever, and is shiftable slightly in leftward and rightward directions as seen in FIG. 22 upon vibration of the lever.

Each lever vibrating unit 246 includes a body or wheel 248 mounted rigidly to a shaft 249 which is journaled by bearings 351 in side walls 235 (FIG. 25) of the corresponding frame member 234, for rotation about an axis 352 extending parallel to axes 213, 215, and 245. Shaft 249 is rotated continuously during operation of the mechanism, and carries three striking elements 250 which are mounted within individual recesses 251 in body 248 for pivotal movement about individual parallel axes 252 extending parallel to main axis 352 of body 248. As will be understood best from FIGS. 28 through 30, the body 248 may be formed of a central part 253 and two opposite side plates 254 secured together by screws 255 or the like, with three individual shafts 256 extending between the end plates 254 for pivotally mounting striking elements 250. The recesses 251 formed in portion 253 of the wheel body structure 248 have the cross section illustrated in FIGS. 28 and 29, with cylindrically curving portions at 257 engaging correspondingly curved surfaces of elements 250, and with essentially planar stop shoulders being formed at 258 and 259 for engaging corresponding stop shoulder surfaces formed on elements 250 to limit the pivotal movement of each element 250 to the range of movement illustrated in FIGS. 28 and 29. In the position in which a particular one of the elements 250 is pivoted radially inwardly as far as permitted by stop shoulder 259, that element has a small rounded portion 260 which projects radially outwardly beyond the circular periphery of wheel body 248 and which therefore requires slight leftward displacement of the engaged roller 247 and lever 239 in a manner causing vibratory movement of cutters 233 as the successive elements 250 engage and move past roller 247. The size of this portion 260 of elements 250 in FIGS. 28 and 29 has been greatly exaggerated for purposes of illustration, and should preferably be extremely small in order to assure optimum cutting action on the work piece. Except when a particular one of the elements 250 is actually in engagement with roller 247, that particular element 250 is held centrifugally in a radially outwardly swung position in which shoulder 258 limits its pivotal movement, so that as each element 250 reaches roller 247 it strikes the roller abruptly, and is then forced radially inwardly on passing the roller.

The shafts 249 of the two rotary vibrating units 248 are driven continuously and in unison by motor 203 through two oppositely inclined shafts 261 and 262 (FIG. 21), contained within a V-shaped housing 263 having bearings 264 by which the shafts are journaled. At their lower or inner ends, the shafts have helical gears 265 which engage and are driven by a helical gear 266 on main shaft 212, while at their upper or outer ends shafts 262 drive shafts 249 through helical gears 267 and 268.

Levers 239 are actuated pivotally about their fulcrum axes 245 by means of two sliding blocks 269 connected to the lower ends of the levers. Each of these blocks contains a central opening 270 into which the lower end of the corresponding one of the levers 239 projects, with a pivot pin 271 connecting the lever to the block at that location. The pivotal axes 272 of pivot pins 271 are parallel to one another and parallel to axes 245, 352, et cetera.

Blocks 269 are mounted for sliding movement horizontally toward and away from one another and along an axis 273 extending parallel to the axis of sliding movement 237 of cutter carriers 233. The blocks are guided for this movement by opposed ways 274 (FIG. 25), which may be suitably secured by screws 275 or the like to the inner sides of the two vertical walls 235 of each of the frame members 234.

For power actuating blocks 269 toward and away from one another, each block may have connected thereto a lead screw 276 (FIG. 22), centered about axis 273, and threadedly engaging a coacting nut 277 which is journaled for rotation about axis 273 by appropriate bearings or bushings typically represented at 278. Each nut has a portion 279 projecting radially outwardly therefrom and forming a gear which is engageable with a toothed timing belt 280 to drive gear 279 and therefore nut 277 rotatively about axis 273 in correspondence with rotation of a shaft 281 carrying a second gear 282 engaging belt 280 at the underside of base 201. Bearings 278 may be of any conventional type serving to mount nut 277 for rotation while preventing axial movement of the nut, and are typically represented as bushings disposed about externally cylindrical surfaces of the nut at opposite sides of gear portions 79 of the nut, and partially received within a recess 283 in base plate 201 to retain the bearings against axial movement.

The two gears 282 for driving the two nuts 277 rotatively are connected rigidly to opposite ends of the same shaft 281, which is appropriately journaled by bearings 284 for rotation about an axis 285 which is parallel to axis 273 and located at the underside of base plate 201. Shaft 281 is adapted to be power driven in either of two opposite directions by a bevel gear 286 which meshes with and drives in opposite directions two bevel gears 287 and 288 mounted rotatably about shaft 281. These bevel gears 287 and 288 are appropriately retained against axial movement relative to shaft 281, and are connectible to shaft 281 in driving relation by two clutches 290 and 291. Clutch 290 includes an axially shiftable clutch element 292, which is splined to shaft 281 at 293 to always turn with the shaft. Element 292 has clutching lugs 294 which are engageable in driving relation with lugs 295 projecting from bevel gear 287 when element 292 is shifted rightwardly. For effecting such shifting movement of element 292, there is provided an actuating block 296 mounted at the underside of base plate 201 by guideways 297 for sliding movement parallel to axes 273 and 285.

This block 296 has a lug 298 projecting downwardly therefrom and received within an annular groove 299 formed in the periphery of element 292, to shift element 292 axially upon corresponding movement of block 296, while at the same time allowing free rotation of element 292 relative to lug 298.

The second clutch 291 includes a similar clutching element 300 splined to shaft 281 at 301 and movable axially by a lug 302 projecting downwardly from block 296. Element 300 has lugs at its left side which are engageable with similar lugs formed on bevel gear 288 to drive that gear rotatively upon leftward movement of clutching element 300. As will be apparent, block 296 is movable leftwardly to a position in which shaft 281 is driven by bevel gear 288, and rightwardly to a position in which shaft 281 is driven by bevel gear 287, and is also actuable to an intermediate neutral position in which neither of the pairs of clutch lugs is in engagement, and therefore shaft 281 is not driven by either of the bevel gears 287 or 288.

Block 296 and the clutches are actuable between the discussed three settings by means of a lever 303 (FIGS. 22 and 23), which is pivotally connected at 304 to base plate 201 for swinging movement about an axis extending parallel to main axis 213. At its lower end, lever 303 may have a spherical portion 305 received within a correspondingly spherical socket recess formed in block 296 to effect horizontal movement of the block in correspondence with pivot movement of the lever. At its upper end, the lever may be pivotally connected to an actuating rod 306, appropriately guided for horizontal sliding movement and having an actuating handle 307 which is accessible for manual operation at the outside of the machine. Indicia 308 associated with the handle indicate the three "forward", "reverse" and "neutral" settings of the apparatus.

For effecting an automatic reversal of the clutching mechanism upon arrival of the cutting elements at a predetermined fully advanced position, a pin 309 (FIG.

22) may be rigidly carried by one of the sliding blocks 269, and project downwardly therefrom through an opening 310 in base plate 201. The lower end of this pin 309 may project into a recess 311 formed in the upper side of block 296, and having vertical shoulders 312 and 313 engageable with pin 309 for automatic actuation of the clutches in a manner to be described at a later point.

With reference now to FIG. 24, the bevel gear 286 which drives the clutch units 290 and 291 of FIG. 22 is itself continuously driven by main shaft 212 through a reduction gear assembly 314 which turns gear 286 at a relatively slow rate as compared with the rate of rotation of main shaft 212. The drive for this reduction gear assembly is taken from the back end of main shaft 212 through a gear 315 on that shaft, which drives a gear 316 through an idler 317. Gear 316 in turn drives input shaft 318 of the reduction gear assembly 314, whose output shaft 319 carries and drives the discussed bevel gear 286. When one of the clutches 290 or 291 is in engagement, the drive through it to nuts 277 and levers 239 is at a rate to cause very slow pivotal movement of levers 239 while the vibrating units 248 are turning very rapidly and causing rapid vibration of the cutter elements.

To now describe a cycle of operation of the apparatus shown in FIGS. 18 through 30, assume that a gun 204 has been clamped in position on the upper surface of holder 205, by clamps 232, and in a position in which the opposite side surfaces of the gun stock are positioned for engagement by the two cutter elements 207. Assume also that motor 203 is in operation, and is continuously driving shaft 212, which in turn is continuously driving transverse shafts 221 to orbitally oscillate the gun within the vertical plane designated 224 in FIG. 27. The rotation of shaft 212 also acts through reduction gear 314 to drive shaft 281 of FIGS. 22 and 23, but initially control handle 307 is in its neutral position of FIG. 23, in which neither of the clutches 290 or 291 is turning shaft 281. The drives to the rotary elements 246 are however engaged to turn those rotary elements even while control handle 307 is in its neutral position. As seen in FIG. 23, before commencement of a cycle of operation the levers 239 are in their outwardly inclined positions in which cutter holders 233 and the cutters 207 are retracted outwardly away from engagement with the work piece, and with the automatic clutch actuating pin 309 being in engagement with the right-hand end shoulder 312 of recess 311 in block 296 (with clutches 290 and 291 both disengaged as previously indicated). After the gun has been clamped in position, the operator actuates handle 307 inwardly to its forward drive condition, to swing control lever 303 in a counterclockwise direction to its broken line position of FIG. 23, and to thereby shift block 296 rightwardly as indicated in broken lines in FIG. 23 to a position in which clutch 290 is engaged and clutch 291 still remains disengaged. Such actuation of the clutch causes transmission of power from bevel gears 286 and 287 through clutch element 292 to shaft 281, to thereby drive the two nuts 277 in a direction in which they act through the mating screws 276 to simultaneously advance blocks 269 progressively away from one another and at a common rate, to thereby slowly swing the upper ends of levers 239 relatively toward one another, and thus progressively advance cutter elements 207 at a common rate toward opposite sides of the work piece. At the same time, the rotating units 246 act to vibrate levers 239 at the locations of their fulcrums 245, and thus vibrate cutter elements 207 rapidly toward and away from the work piece and along horizontal axis 237. The rate of vibratory movement of the cutters is much more rapid than the very slow rate of linear advancement of those cutters along axis 237, so that the cutters gradually form patterns in the opposite side faces of the work piece corresponding to the patterns of the cutting edges themselves. The simultaneous continuous orbital movement of the work piece in vertical plane 224 causes a slight relative shifting movement of the work piece and cutting edges in a manner optimizing the cutting action and facilitating movement of the removed powdered material of the work piece from the recesses or grooves formed by the cutters in that work piece.

When the cutting elements 207 reach predetermined positions in which they have cut to a desired ultimate depth into the work piece, pin 309 engages shoulder 313 of block 296 (FIGS. 22 and 23), and automatically shifts block 296 leftwardly, to disengage clutch 290, and thereby halt advancement of the cutters by the mechanism. An overcenter spring or other similar structure represented at 320 in FIG. 22 continues the movement of block 296 far enough to shift lever 303 and control handle 307 to their reverse drive conditions of FIG. 22, and thus shift clutch 291 into its engaged condition in which it commences rotation of shaft 281 in a reverse direction, to cause automatic return of blocks 269 by screw and nut mechanisms 276–277 relatively toward one another to allow retraction of cutter elements 233 away from the work piece. This reversed drive continues until pin 309 strikes shoulder 312 of block 296 and shifts the block and connected control handle 307 to their neutral settings, in which neither of the clutches 290 and 291 is engaged, and therefore cutter shifting movement of lever 239 is halted until a new work piece has been attached to holder 205 and actuating handle 307 has again been shifted to its forward or starting position. The overcenter spring 320 is desirably so designed that it does not shift block 296 beyond the neutral position upon such completion of the reverse or cutter withdrawing movement of the levers 239.

While a certain specific embodiment of the present invention has been disclosed as typical, the invention is of course not limited to this particular form, but rather is applicable broadly to all such variations as fall within the scope of the appended claims.

I claim:
1. Apparatus comprising:
   a cutter structure having cutting edges arranged in a predetermined pattern which is to be essentially reproduced on a work piece;
   means for producing relative vibratory movement between said cutter structure and said work piece, while the cutter structure is positioned for contact with the work piece, and in a relation progressively cutting said pattern on the work piece; and
   means for shifting the work piece in a lateral direction during said relative vibratory movement and in addition thereto.

2. Apparatus as recited in claim 1, in which said work piece shifting means are operable to oscillate the work piece during said relative vibratory movement.

3. Apparatus as recited in claim 1, in which said vibrating means are constructed to vibrate the cutter structure essentially toward and away from the work piece; said work piece shifting means including a holder for said work piece, and powered mechanism for oscillating said holder and the carried work piece orbitally as the cutter structure vibrates and generally transversely of the direction of said vibratory movement.

4. Apparatus as recited in claim 1, in which said vibrating means include a wheel having actuating elements acting upon rotation of the wheel to vibrate said cutter structure; said work piece shifting means including a holder for said work piece, and oscillating means for moving said holder and the carried work piece orbitally during said vibratory movement of the cutter structure and in a direction generally transversely of the direction of the vibratory movement; there being advancing means for progressively moving the cutter structure toward the work piece during the vibratory movement; and motor means for simultaneously driving said wheel, and said oscillating means and said advancing means.

5. Apparatus comprising:
a cutter structure having cutting edges arranged in a predetermined pattern which is to be essentially reproduced on a work piece;
means for producing relative vibratory movement between said cutter structure and said work piece, while the cutter structure is positioned for contact with the work piece, and in a relation progressively cutting said pattern on the work piece;
a guideway structure mounting and positively guiding said cutter structure for sliding movement along only a predetermined path toward and away from the work piece; and
means for progressively advancing the cutter structure toward the work piece during said vibratory movement.

6. Apparatus as recited in claim 5, including means for relatively oscillating said cutter structure and said work piece during said vibratory movement and in addition thereto.

7. Apparatus comprising:
a cutter structure having cutting edges arranged in a predetermined pattern which is to be essentially reproduced on a work piece;
means for producing relative vibratory movement between said cutter structure and said work piece, while the cutter structure is positioned for contact with the work piece, and in a relation progressively cutting said pattern on the work piece;
said means including a wheel power driven rotatably about an axis, and at least one actuating element carried by the wheel for rotation therewith and free for limited motion relative thereto and acting upon rotation of the wheel to repeatedly strike a coacting surface in a manner producing said vibratory movement.

8. Apparatus as recited in claim 7, in which said actuating element is mounted pivotally to the wheel for rotation therewith and for swinging movement radially outwardly and inwardly relative to said axis, there being a surface positioned to be struck repeatedly by said actuating element as the wheel turns in a relation producing vibratory movement of the cutter structure toward and away from the work piece.

9. Apparatus comprising:
a cutter structure having cutting edges arranged in a predetermined pattern which is to be essentially reproduced on a work piece;
means for producing relative vibratory movement between said cutter structure and said work piece, while the cutter structure is positioned for contact with the work piece, and in a relation progressively cutting said pattern on the work piece;
said means including a lever mounted to swing essentially about a predetermined fulcrum and having a portion offset from said fulcrum which acts upon said swinging movement of the lever to progressively advance the cutter structure toward the work piece, and a vibrating element acting against the lever at approximately the location of said fulcrum and acting to vibrate the lever and through it to vibrate the cutter structure.

10. Apparatus as recited in claim 9, in which said vibrating element is a wheel mounted to turn about an axis and having at least one irregularity serving to vibrate the lever upon rotation of the wheel.

11. Apparatus as recited in claim 10, including powered means for simultaneously rotating said wheel to vibrate the cutter structure and swinging said lever to advance the cutter structure toward the work piece.

12. Apparatus as recited in claim 9, including a guideway structure mounting said cutter for sliding movement toward and away from the work piece and mounting the cutter structure at a location for advancement and vibration by said portion of the lever.

13. Apparatus as recited in claim 9, including a screw and nut actuating mechanism acting against said lever at a location offset from said fulcrum and serving to swing the lever about said fulcrum upon relative rotation of the screw and nut, and means for relatively rotating said screw and nut to swing the lever and advance said cutter structure toward the work piece during vibration of the lever and cutter structure by said vibrating element.

14. Apparatus as recited in claim 9, in which there are two of said cutter structures for engaging and forming a pattern on opposite sides of the work piece, and having two of said levers and two of said vibrating elements at essentially the locations of the fulcrums of the two levers, there being powered means for simultaneously swinging the two levers about their respective fulcrums in opposite directions to move the two cutter structures simultaneously toward one another and toward opposite sides of the work piece.

15. Apparatus as recited in claim 14, in which said vibrating elements are two wheels power driven rotatably about two axes and having pivotally carried elements which successively engage and vibrate the levers, there being guideways mounting the cutter structures for movement toward and away from the work piece by first ends of said levers, and two screw and nut mechanisms power driven in timed relation and acting upon relative rotation of their screws and nuts to progressively swing the levers in the direction to move the cutter structures toward the work piece.

16. Apparatus as recited in claim 15, including a holder for holding the work piece, and powered means for oscillating said holder and work piece orbitally during the vibration and advancement of the cutter structures and in a plane disposed essentially transversely of the direction of vibration of the cutter structures.

17. Apparatus comprising:
a cutter structure having cutting edges arranged in a predetermined pattern which is to be essentially reproduced on a work piece;

means for producing relative vibratory movement between said cutter sturcture and said work piece, while the cutter structure is positioned for contact with the work piece, and in a relation progressively cutting said pattern on the work piece;

powered means for advancing said vibrating cutter structure progessively toward the work piece and then in a reverse direction away from the work piece;

and automatic control means responsive to advancement of the cutter structure in a direction toward the work piece to a predetermined position to halt such advancement and automatically commence said powered reverse movement of the cutter structure away from the work piece.

18. Apparatus as recited in claim 17, in which said powered means include reversible clutch means for driving said cutter structure in opposite directions, and said automatic control means include means responsive to arrival of said cutter structure at said predetermined position to reverse the clutch means for withdrawing the cutter structure from the work piece.

19. Apparatus as recited in claim 17, in which said powered means include a screw element and a mating nut element one of which is power driven rotatably and acts upon such rotation to shift the other element axially, a connection for advancing and retracting said cutter structure in response to movement of said other element in its opposite directions, and a clutch for reversing the direction of drive of said one element, said automatic control means including means responsive to axial displacement of said other element to a predetermined advanced cutter setting to automatically shift the clutch from a cutter advancing condition to a reversed cutter retracting condition.

20. Apparatus as recited in claim 19, in which there are two of said cutter structures and two of said screw and nut mechanisms driven in unison by said clutch for actuating the two cutter structures.

21. Apparatus as recited in claim 20, including two levers actuable at first ends by said screw and nut mechanisms and acting at second ends to advance said cutter structures upon swinging movement of the levers about predetermined intermediate fulcrums, said means for producing vibratory movement including two power driven wheels having irregularities acting upon rotation of the wheels to repeatedly strike said levers at essentially said fulcrums and to thereby vibrate the levers and the cutter structures toward and away from the work piece.

* * * * *